United States Patent [19]

Kawasaki et al.

[11] 4,246,949
[45] Jan. 27, 1981

[54] TUBELESS BIAS-PLY TIRE WITH AT LEAST ONE CARCASS PLY ENDING NEAR BEAD CORE WITHOUT BEING WRAPPED THEREAROUND

[75] Inventors: Takemi Kawasaki; Tetsuro Sasaki, both of Kobe, Japan

[73] Assignee: Sumitomo Ru-ber Industries, Ltd., Hyogo, Japan

[21] Appl. No.: 47,732

[22] Filed: Jun. 12, 1979

[30] Foreign Application Priority Data

Jun. 13, 1978 [JP] Japan .................................. 53-71762

[51] Int. Cl.³ ........................ B60C 9/06; B60C 15/00; B60C 15/06
[52] U.S. Cl. .......................... 152/354 R; 152/362 R; 152/362 CS; 152/DIG. 16
[58] Field of Search ............ 152/354 R, 354 RB, 355, 152/356, 362, 362 CS, DIG. 16

[56] References Cited

U.S. PATENT DOCUMENTS

| | | | |
|---|---|---|---|
| 1,393,952 | 10/1921 | Miller | 152/362 R |
| 1,451,645 | 5/1963 | Archer | 152/362 R |
| 2,741,295 | 4/1956 | Kindle et al. | 152/DIG. 16 |
| 3,682,217 | 8/1972 | Marzocchi | 152/356 |
| 3,980,119 | 9/1976 | Nakasaki | 152/354 |
| 4,077,454 | 3/1978 | Miyoshi et al. | 152/354 R |
| 4,162,698 | 7/1979 | Merli et al. | 152/362 R X |

FOREIGN PATENT DOCUMENTS 1091507 11/1967 United Kingdom ................ 152/362 R

*Primary Examiner*—John T. Goolkasian
*Assistant Examiner*—Lois E. Rodgers
*Attorney, Agent, or Firm*—Birch, Stewart, Kolasch & Birch

[57] ABSTRACT

A bias-ply pneumatic tire comprises a tire cover having a thread portion, a pair of opposed side walls integral with the tread portion and a pair of opposed bead portions integral with the respective side walls and adapted to firmly engage with associated rim flanges of a wheel rim. Each of the bead portions includes at least one bead core embedded therein. The tire cover includes a bias-ply carcass structure composed of a plurality of carcass plies laid on a bias at a predetermined angle with respect to the midcircumferential plane of the tire. At least one of the carcass plies in the tire cover has its opposed ends each terminating, without being turned up around and anchored to the corresponding bead core, in a region between the corresponding bead core and a lower portion of the corresponding side wall while the other of the carcass plies have their opposed ends each being turned up around and anchored to the corresponding bead core, thereby terminating at a position adjacent the boundary between the side wall and the bead portion.

7 Claims, 12 Drawing Figures

TUBELESS BIAS-PLY TIRE WITH AT LEAST ONE CARCASS PLY ENDING NEAR BEAD CORE WITHOUT BEING WRAPPED THEREAROUND

BACKGROUND OF THE INVENTION

The present invention generally relates to a pneumatic tire and, more particularly, to a bias-ply pneumatic tire suited for use on a motorcycle.

There is known a pneumatic tire suited for use on a motorcycle which comprises, as best shown in FIG. 1 of the accompanying drawings, a tire cover 10 having a tread portion 11, a pair of opposed side walls 12 one on each side of the tread portion 11 and integral with the tread portion 11 and a pair of opposed bead portions 13 integral with the respective side walls 12 and adapted to firmly engage with associated wheel rim flanges 21 of a wheel rim 20, a bias-ply carcass structure 14 embedded in the tire cover 10 and having opposed ends turned up around and anchored to the respective bead portions 13 in the tire cover 10, and an inner lining 15 of a blended rubber material which is impervious to air and which is coated on the inner surface of the tire cover 10. The bias-ply carcass structure 14 is constituted by a plurality of carcass plies of juxtaposed textile cords, which carcass plies are alternately laid down on a bias relative to the midcircumferential plane of the tire.

The pneumatic tire of the construction so far described may be used in practice either with or without an inner tube therein. However, where the pneumatic tire is designed for use without the inner tube, that is, in the form of a tubeless pneumatic tire, the inner lining 15 has a wall thickness larger than that required in the pneumatic tire for use with the inner tube therein. The employment of the larger wall thickness of the inner lining 15 is necessitated to prevent objectionable diffusion of air from within the tire cover 10 and through the side walls, such diffusion of air being objectionable not only from the standpoint of loss of inflation pressure, but also because of a high rate of diffusion of air into the side walls 12 tending to blister and separate the carcass plies from the body material forming the tire cover 10. The inner lining 15 usually extends circumferentially of the tire between the opposed bead portions 13 and extends down to the region of the toes of the respective bead portions 13.

On the other hand, it has often experienced that, when the pneumatic tire in use is, for example, pierced with the inflation pressure consequently reduced, at least one of the opposed bead portions of the tire is displaced in a direction generally transversely of the midcircumferential plane of the tire into a rim well or drop center portion of the wheel rim under the influence of an external lateral force acting on the tire in a direction generally transversely of the midcircumferential plane of the tire. Once this displacement happens, the worst that may happen would be a traffic accident and/or physical damages to a motorcyclist.

In order to avoid the possible displacement of the bead portion 13 into the rim well, an improvement has been made to the design of the wheel rim, an example of which is shown in FIG. 1 of the accompanying drawings. Referring still to FIG. 1, the wheel rim, generally identified by 20, includes a substantially radially inwardly concaved rim well 22, generally flat bead seats 23 one on each side of the rim well 22, a pair of opposed, generally radially outwardly extending rim flanges 21, and a pair of opposed ribs 24 each radially outwardly protruding from one side portion of the corresponding bead seat 23 remote from the rim flange 21 and extending circumferentially of the wheel rim 20. When the tire is mounted on the wheel rim 20, a rim engaging face or base of each of the bead portions 13 is seated on the corresponding bead seat 23 with toe and heel respectively tightly contacting the adjacent rib 24 and the adjacent rim flange 21.

The conventional wheel rim 20 shown in FIG. 1 is so designed that, when one or both of the bead portions 13 of the pneumatic tire tends to be displaced into the rim well 22, the corresponding rib 24 prevents such bead portion 13 from slipping into the rim well 22.

Since the pneumatic tire for particular use on a motorcycle is generally small in size, the effective width RW of the wheel rim 20 for the support of such tire thereon is limited to a relatively small value and the width WW of the rim well 22 is correspondingly limited to a value as required for the effective mounting of the tire on the wheel rim 20. Therefore, if the wall thickness of the inner lining 15 is increased to enable the tire to be used in practice without an inner tube disposed therein, that is, to enable the tire to be used as a tubeless tire, the pneumatic tire having the inner lining 15 of increased wall thickness can no longer be mounted on the wheel rim 20 having the bead seats 23 with a fixed width SW. This means that a particular construction of the wheel rim is required, depending upon which tire is utilized, that is, depending on whether or not an inner tube is utilized in the tire. More specifically, if the wall thickness of the inner lining 15 in the tire designed for use with the inner tube is merely increased to enable such tire to be used in the form of a tubeless tire, the volume of each of the bead portions 13 increases correspondingly to such an extent that the base of the corresponding bead portion 13 can no longer be accommodated within the fixed width SW of the associated bead seat 23 of the wheel rim 20. If the tubeless tire, the bead portions of which have their bases of a width larger than the fixed width SW of the associated bead seats 23 of the wheel rim 20, is mounted on the wheel rim 20 of the construction shown in FIG. 1, there is the increased possibility of the lateral displacement of the bead portion 13 into the rim well 22.

On the other hand, if an attempt is made during the manufacture of the tire to render the width BW of the base of each bead portion to be equal or slightly smaller than the width SW of the corresponding bead seat 23 by reducing the wall thickness of the tire cover 10 and/or the number of carcass plies, the resultant tire would no longer be used as a tubeless tire with the bead portions exhibiting a poor performance. As is well known to those skilled in the art, each of the bead portions of the pneumatic tire in general has a number of tasks, i.e., to anchor the carcass plies to withstand the deformation forces resulting from running the tire, to withstand the inflation pressure, to transmit longitudinal forces and to provide a seal between the tire and the wheel rim. Therefore, where the poor performance of the bead portions is such that a complete seal cannot be obtained between the tire and the wheel rim and/or that the tire cannot withstand the deformation force acting particularly in a direction generally transversely of the midcircumferential plane of the tire, such tire cannot be used in the form of a tubeless tire, that is, without the inner tube.

Yet, it has been well recognized by those skilled in the art that the pneumatic tire having the bias-ply carcass structure is superior to the pneumatic tire having the radial-ply carcass structure in respect of providing a comfortable riding, a rigidity of the side walls, and a stable drivability particularly during cornering. However, the bias-ply pneumatic tire requires by nature a larger number of the carcass plies than that in the radial-ply pneumatic tire. In view of this, the manufacture of the bias-ply pneumatic tire involves some problems peculiar to such bias-ply pneumatic tire. By way of example, not only is the placement of the carcass plies one above the other to form the bias-ply carcass structure complicated and time-consuming, but also it requires a lot of labor and skill in workmanship. In addition, the productivity of the bias-ply pneumatic tire is limited as compared with that of the radial-ply pneumatic tire.

SUMMARY OF THE INVENTION

Accordingly, the present invention has been made in view to substantially eliminating the above described disadvantages and inconveniences inherent in the prior art bias-ply pneumatic tire and has for its essential object to provide an improved bias-ply pneumatic tire which tightly fits on the conventional wheel rim to provide a complete seal between the tire and the wheel rim so that it can be used as a tubeless tire.

Another important object of the present invention is to provide an improved bias-ply pneumatic tire of the type referred to above, capable of providing a comfortable riding vehicle with stable drivability.

A further object of the present invention is to provide an improved bias-ply pneumatic tire of the type referred to above, which can be readily manufactured with high productivity.

In particular, according to a preferred embodiment of the present invention, substantial elimination of the above described disadvantages and problems inherent in the prior art bias-ply pneumatic tire can be achieved by employing the arrangement wherein at least one of the carcass plies of juxtaposed textile cords has its opposed ends terminating, without being turned up around and anchored to the corresponding bead core within the bead portion, in a region of the tire cover defined between a lower portion of the corresponding side wall, which is located radially inwardly of the tire with respect to the region of the side wall where the ends of the other carcass plies terminate after having been turned up around and anchored to the bead core.

According to another preferred embodiment of the present invention, while each end of at least one of the carcass plies terminates in the region defined above without being turned up and anchored to the corresponding bead core, the inner lining which extends circumferentially of the tire between the opposed bead portions extends down to the region of the toes of the respective bead portions and is turned up around the bead portions, terminating in contact with the outer surface of the respective side walls. So far as the pneumatic tire according to the second mentioned preferred embodiment of the present invention is involved, no reinforcement for each bead portion, which is generally referred to as a bead chafer or a bead filler, is required, in contrast to the prior art bias-ply pneumatic tire which requires the employment of the bead reinforcement for reinforcing each bead portion to improve the resistance to wear which may otherwise result from the frictional contact of the bead portion to the wheel rim.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 2:
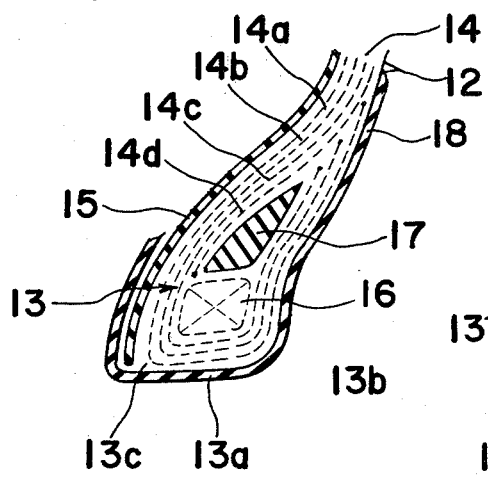
FIG. 2 is a transverse cross sectional view, on an enlarged scale, through one of the opposed bead portions of a bias-ply pneumatic tire according to one preferred embodiment of the present invention.
Figure 3:
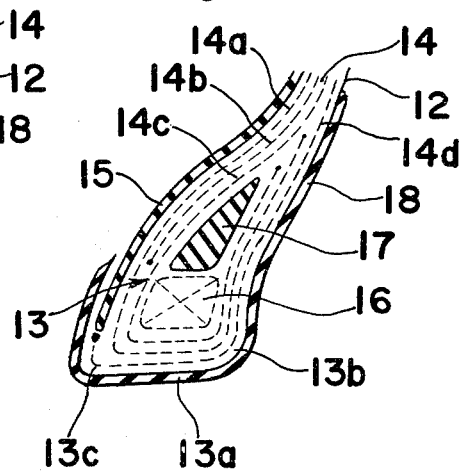
FIGS. 3 to 12 are views similar to FIG. 2, showing other preferred embodiments of the present invention.
Figure 4:
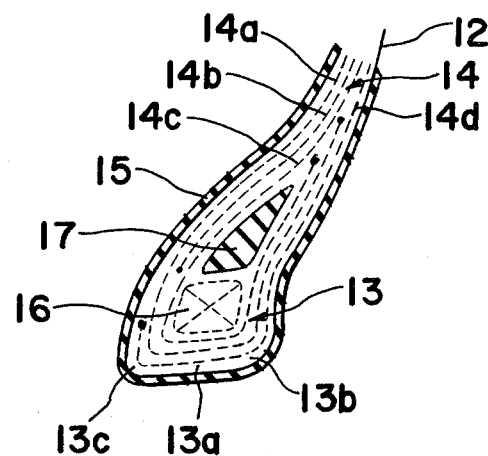

Before the description of the present invention proceeds, it is to be noted that like parts are designated by like reference numerals throughout the accompanying drawings. It is also to be noted that the concept of the present invention is applicable not only to the pneumatic tire for use on a motorcycle, but also to the pneumatic tire for use on any other vehicles such as passenger cars, buses and trucks. Specifically, the bias-ply pneumatic tire constructed according to any one of the embodiments shown in FIGS. 2 to 4 is particularly suited for use on a motorcycle. The bias-ply pneumatic tire constructed according to any one of the embodiments shown in FIGS. 5 to 8 is particularly suited for use on a passenger car or a light truck, and the bias-ply pneumatic tire constructed according to any one of the embodiments shown in FIGS. 9 to 12 is particularly suited for use on a bus or a large-size truck.

As is well known to those skilled in the art, the bias-ply pneumatic tire to which the present invention is directed is such that the carcass plies of juxtaposed textile cords made up by synthetic or natural textile fibers are alternately laid on a bias at an angle within the range of 25° to 45° relative to the midcircumferential plane of the tire. So far as the bias-ply pneumatic tire to which the present invention is directed is concerned, it may be used in practice either with or without the inner tube employed inside such tire.

Figure 1:
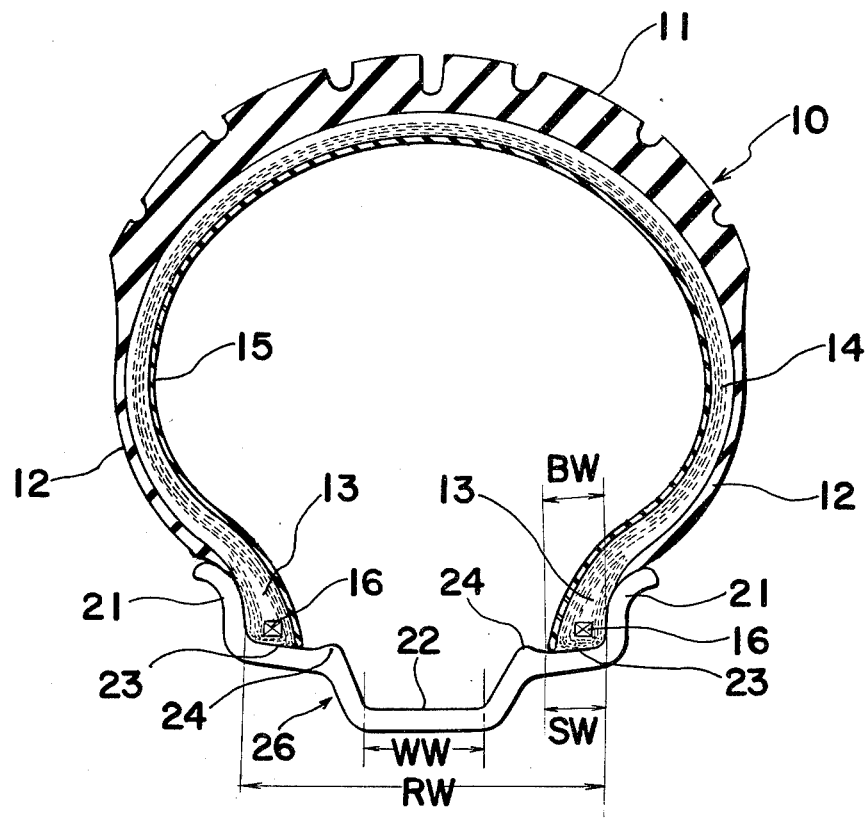
FIG. 1 is a transverse cross sectional view of the prior art bias-ply pneumatic tire mounted on the conventional wheel rim.

Referring first to FIG. 2, only one of the opposed bead portions 13 of the bias-ply pneumatic tire embodying the present invention is shown and, in addition, the number of the carcass plies forming the bias-ply carcass structure 14 is shown to be four as identified by 14a, 14b, 14c and 14d. In FIG. 2, reference numerals 16 and 17 represent, respectively, a bead core, composed of a bundle of bead wires and embedded in each of the bead portions 13 as best shown in FIG. 1, and a filler strip well known to those skilled in the art.

In the embodiment shown in FIG. 2, while the carcass plies 14a, 14b and 14c except for the outermost carcass ply 14d are, at one end thereof, turned up around and anchored to the corresponding bead core 16, the outermost carcass ply 14d has each end terminating, without being turned up around and anchored to the bead core 16, in a region of the tire cover 10 between the bead core 16 and a lower portion of the corresponding side wall where the ends of the other carcass plies 14a to 14c terminate after having been turned up around and anchored to the bead core 16 and, preferably, at a position adjacent the bead core 16 and remote from the rim engaging face or base 13a of the corresponding bead portion 13.

Reference numeral 18 represents a bead chafer extending circumferentially of the tire and extending from each side wall 12 down to the heel 13b and terminating, after having been traversed along the base 13a and then turned around the toe 13c, in overlapped relation to the inner lining 15.

In the embodiment shown in FIG. 3, one of the carcass plies intermediately between the innermost and outermost carcass plies 14a and 14d, for example, the carcass ply 14c, is made to terminate in the definite region defined above. On the other hand, the outermost carcass ply 14d is turned substantially halfway around the bead core 16 after having extended down to the heel 13b on one side of the bead core 16 opposite to the inner lining 15 and towards the toe 13c along the base 13a of the corresponding bead portion 13.

In either one of the foregoing embodiments shown in FIGS. 2 and 3, respectively, any one of the carcass plies preferably except for the innermost carcass ply may be chosen to terminate in the definite region defined above. In addition, the number of the carcass plies chosen to terminate in the definite region between the bead core 16 and that lower portion of the corresponding side wall 12 without being turned up around and anchored to the bead core 16 may not be always limited to one such as shown in any one of FIGS. 2 and 3, but may be two or more, less the innermost carcass ply 14a.

In the embodiment shown in FIG. 4, the carcass ply 14b adjacent the innermost carcass ply 14a is chosen to terminate in the definite region without being turned up around and anchored to the bead core 16 while the outermost carcass ply 14d extends in a manner identical with that shown in FIG. 3. In addition, instead of the employment of the bead chafer which has been shown by 18 in FIGS. 2 and 3, the inner lining 15 extends down to the region of toe 13c of the corresponding bead portion 13 and are turned up around such corresponding bead portion 13, terminating in contact with the outer surface of the corresponding side wall 12.

Figure 5:
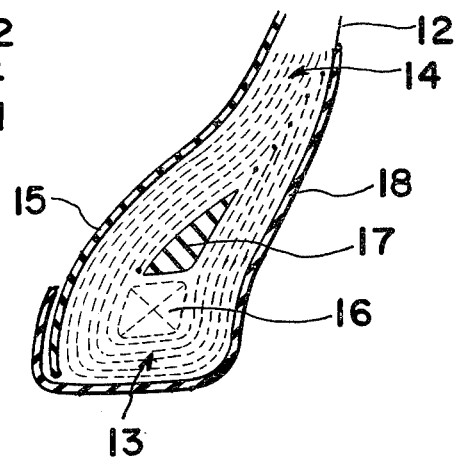
Figure 6:
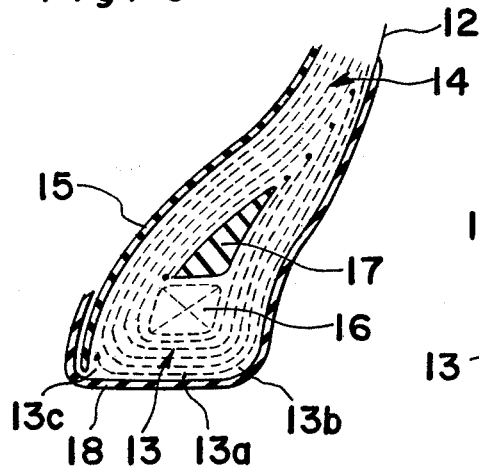

The bias-ply pneumatic tire according to the embodiment shown in FIG. 5 is substantially similar in construction to that shown in FIG. 2, but differs therefrom in that the number of the carcass plies shown in FIG. 5 is six. Similarly, the bias-ply pneumatic tire according to the embodiment shown in FIG. 6 is substantially similar in construction to that shown in FIG. 3, but differs therefrom in that the number of the carcass plies shown in FIG. 6 is six.

Figure 7:
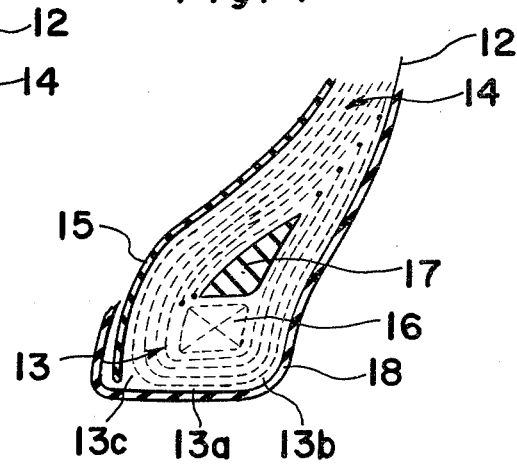

An example of the bias-ply pneumatic tire wherein two of the six carcass plies terminate in the definite region between the bead core 16 and the corresponding side wall 12 without being turned up around and anchored to such bead core 16 is shown in FIG. 7.

Figure 8:
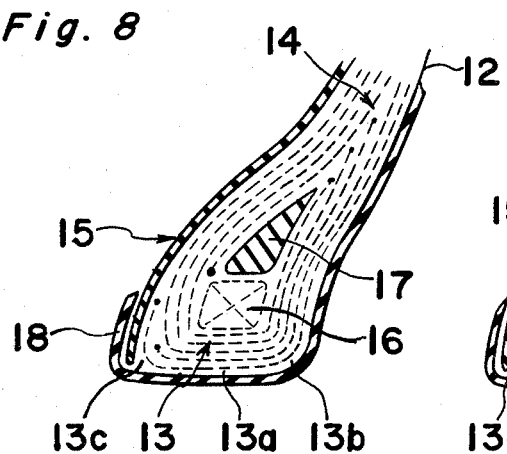

The bias-ply pneumatic tire according to the embodiment shown in FIG. 8 is substantially similar to that shown in FIG. 7. However, in this embodiment, the outermost carcass ply and one of the other carcass plies which is next to the outermost carcass ply are turned substantially halfway around the bead core 16 after having extended down to the heel 13b on one side of the bead core 16 remote from the inner lining 15 and towards the toe 13c along the base 13a of the corresponding bead portion 13, while the third carcass ply from the outermost carcass ply terminates in the definite region without being turned up around and anchored to the bead core 16.

In any one of the embodiments respectively shown in FIGS. 9 to 12, the bias-ply carcass structure 14 is shown as comprising eight carcass plies 14e, 14f, 14g, 14h, 14i, 14j, 14k and 14m and, simultaneously therewith, each of the bead portions 13 includes inner and outer bead cores 13x and 13y each composed of a bundle of bead wires as is well known to those skilled in the art.

Figure 9:
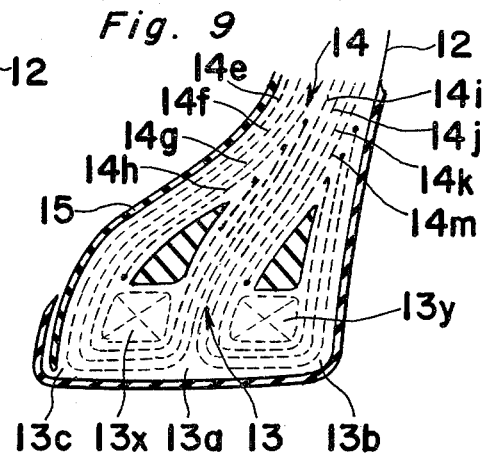

In particular, in the embodiment shown in FIG. 9, the carcass plies 14h and 14m terminate, without being turned up around and anchored to the associated bead cores 13x and 13y, in the region between any one of the bead cores 13x and 13y and the lower portion of the corresponding side wall 12 where the ends of the other carcass plies 14e, 14f, 14g, 14i, 14j and 14k terminate after a group of the carcass plies 14e, 14f and 14g and a group of the carcass plies 14i, 14j and 14k have been turned up around and anchored to the associated bead cores 13x and 13y, respectively.

Figure 10:
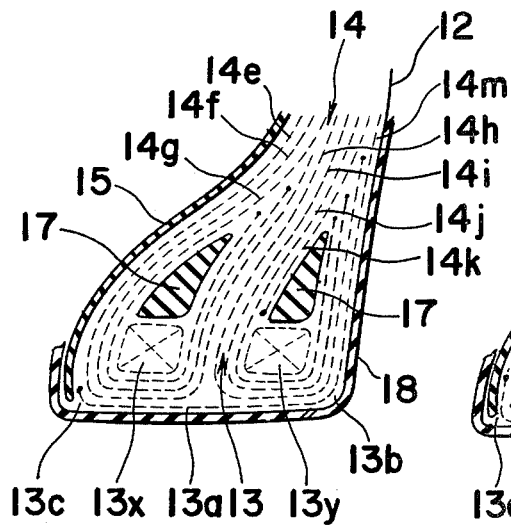

In the embodiment shown in FIG. 10, only the carcass ply 14k terminates in the region between the associated bead core 13y and the lower portion of the bead portion 13 without being turned up and anchored to the bead core 13y. On the other hand, the carcass ply 14m extends down to the heel 13b on one side of the bead core 13y remote from the inner lining 15 and then towards the toe 13c along the base 13a of the corresponding bead portion 13, terminating on one side of the bead core 13x remote from the bead core 13y.

Figure 11:
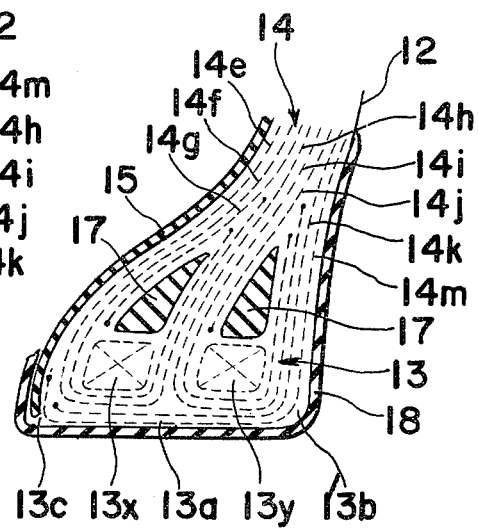
Figure 12:
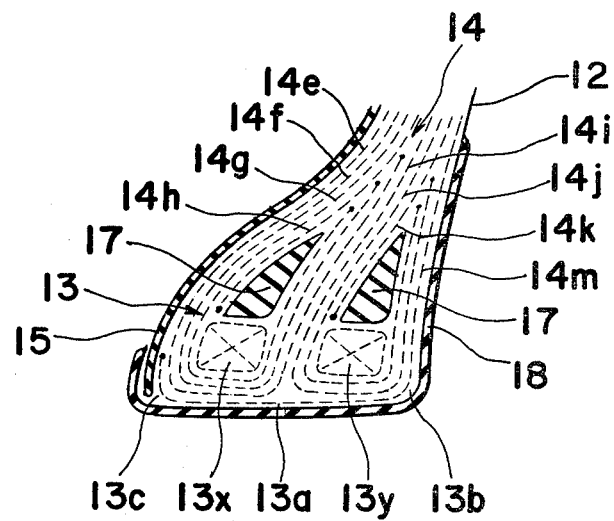

Likewisely, in the embodiment shown in FIG. 11, the carcass plies 14g and 14m terminate in the definite region in a manner similar to the carcass plies 14h and 14m in the embodiment shown in FIG. 9, but the carcass plies 14k and 14m extend down to the heel 13b on one side of the bead core 13y remote from the inner lining 15 and then towards the toe 13c along the base 13a of the corresponding bead portion 13, terminating on one side of the bead core 13x remote from the bead core 13y. In the embodiment shown in FIG. 12, the carcass plies 14h and 14k terminate in the definite region in a manner similar to the carcass plies 14h and 14m in the embodiment shown in FIG. 9, but the carcass ply 14m extends down to the heel 13b on one side of the bead core 13y remote from the inner lining 15 and then towards the toe 13c along the base 13a of the corresponding bead portion 13, terminating on one side of the bead core 13x remote from the bead core 13y.

With respect to the manufacture of the bias-ply pneumatic tire embodying the present invention, it can readily be carried out by the employment of at least one carcass ply of a width smaller than that of the remaining carcass plies which ultimately form the bias-ply carcass structure 14 together with said at least one carcass ply. In any event, the pneumatic tire according to the present invention can be manufactured by employing the conventional method, for example, either by placing the carcass plies one above the other on the shaping cylinder and then applying a rubber coating over the outermost carcass ply prior to the curing process or by mounting a cylindrical body of carcass plies, which is generally referred to as a pocket, on the shaping cylinder and then applying a rubber coating over the outermost surface of the cylindrical body of the carcass plies prior to the curing process.

Because of the employment of the carcass ply of a width smaller than the other carcass plies, that is, since the opposed ends of the at least one carcass ply need not be turned up around and anchored to the corresponding bead cores, the resultant tire has the bead seats of correspondingly reduced width BW. Therefore, considering the tire of the present invention being mounted on the conventional wheel rim of the type shown in FIG. 1, not only can the possibility of undesirable disengagement or displacement of at least one of the opposed bead portions 13 over the adjacent rib 24 into the rim well 22 be advantageously minimized, but also a complete seal required to maintain the inflation pressure inside the tire cover 10 at a predetermined or required value can be achieved between the tire of the present invention and the wheel rim.

In addition, because of the reduced volume of each of the bead portions of the tire embodying the present invention, the inner lining 15 may have a relatively large wall thickness, for example, a wall thickness so large as required in the prior art bias-ply pneumatic tire and, yet, so far as the inner lining of the increased wall thickness is employable, the inner lining 15 employed in the present invention may be made of an inexpensive blended rubber material less impervious to air than that required in the prior art bias-ply pneumatic tire.

Specifically, the tire according to the embodiment of the present invention wherein no bead chafer such as shown by 18 is employed and wherein, instead thereof, the inner lining 15 is so designed as to be turned up around each of the opposed bead portions to, for example, a clinch area such as shown in FIG. 4 is particularly effective to substantially eliminate such objectionable diffusion of air within the tire through the side wall 13 as occurring in the prior art bias-ply pneumatic tire.

Although the present invention has fully been described in connection with the preferred embodiments thereof with reference to the accompanying drawings, it is to be noted that various changes and modifications are apparent to those skilled in the art. By way of example, the concept of the present invention embodied in the manner as shown in FIG. 4 may be applicable to any one of the other embodiments of the present invention.

Moreover, although each of the opposed ends of at least one of the carcass plies forming the bias-ply carcass structure 14 has been shown as terminating in the definite region at a position substantially aligned with the boundary between the corresponding bead core and the bead filler, it may extend down to a position spaced a slight distance from the corresponding bead core unless this arrangement ultimately increases the volume of the corresponding bead portion.

Accordingly, such changes and modifications are to be understood as included within the true scope of the present invention unless they depart therefrom.

What is claimed is:

1. A small size bias-ply tubeless pneumatic motorcycle tire comprising a tire cover having a tread portion, a pair of opposed side walls integrally extending from respective side edges of the tread portion and a pair of opposed bead portions integrally extending from respective free ends of the side walls, said bead portions being adapted to firmly engage with associated rim flanges of a wheel rim, an inner rubber lining applied to the inner surface of the tire cover, said tire cover including at least one bead core embedded in each of the bead portions and a bias-ply carcass structure, said bias-ply carcass structure including a plurality of carcass plies alternately laid on a bias at a predetermined angle relative to the midcircumferential plane of the tire, at least one of said carcass plies having each of its opposed ends terminating in a region defined in the tire cover between the corresponding bead core and a lower portion of the corresponding side wall while the remaining of said carcass plies have their opposed ends turned up around and anchored to the corresponding bead core and terminating at a position adjacent the boundary between the side wall and the bead portion, said lower portion of said corresponding side wall being adjacent to said position where the end of each of said other carcass plies terminates after having been turned up around and anchored to the corresponding bead core.

2. A tire as claimed in claim 1, wherein said inner rubber lining has its opposed ends extending down to the respective rim-engaging faces of the bead portions.

3. A tire as claimed in claim 2, further comprising a rubber bead chafer extending circumferentially of the tire and extending from each side wall down to the heel, traversing the base of the heal and turning around the toe in overlapping relationship to the inner lining.

4. A tire as claimed in claim 1, wherein said inner rubber lining has its opposed ends each extending down to the region of the toe of the corresponding bead portion and turned up around said corresponding bead portion, terminating in contact with the outer surface of the corresponding side wall.

5. A tire as claimed in claim 1, wherein said at least one of the carcass plies is located intermediately between the innermost and outermost carcass plies, said inner most and outermost carcass plies being respectively adjacent the outer and inner surfaces of the tire cover.

6. A tire as claimed in claim 1, wherein each of the opposed ends of said at least one of the carcass plies forming the bias-ply carcass structure terminates in said region at a position substantially aligned with the boundary between the corresponding bead core and a bead filler positioned within the corresponding bead portion on one side of said corresponding bead core opposite to a rim-engaging face of the bead portion.

7. A tire as claimed in claim 1, wherein each of the opposed ends of said at least one of the carcass plies forming the bias-ply carcass structure terminates in said region at a position spaced a slight distance from the corresponding bead core.

* * * * *

UNITED STATES PATENT AND TRADEMARK OFFICE
CERTIFICATE OF CORRECTION

PATENT NO. : 4,246,949
DATED : January 27, 1981
INVENTOR(S) : Kawasaki et al

It is certified that error appears in the above—identified patent and that said Letters Patent is hereby corrected as shown below:

In the heading "[73] Assignee:"

change "Ru-ber" to --Rubber--

Signed and Sealed this

Sixteenth Day of June 1981

[SEAL]

Attest:

RENE D. TEGTMEYER

Attesting Officer     Acting Commissioner of Patents and Trademarks